United States Patent
Fourquin et al.

(10) Patent No.: US 11,323,256 B2
(45) Date of Patent: May 3, 2022

(54) METHOD FOR GENERATING ON-BOARD A CRYPTOGRAPHIC KEY USING A PHYSICALLY UNCLONABLE FUNCTION

(71) Applicant: THALES DIS DESIGN SERVICES SAS, Meyreuil (FR)

(72) Inventors: Olivier Fourquin, Meudon (FR); Alexandre Berzati, Meudon (FR); Benjamin Duval, Meudon (FR)

(73) Assignee: THALES DIS DESIGN SERVICES SAS, Meyreuil (FR)

(*) Notice: Subject to any disclaimer, the term of this patent is extended or adjusted under 35 U.S.C. 154(b) by 0 days.

(21) Appl. No.: 17/050,582

(22) PCT Filed: Apr. 24, 2019

(86) PCT No.: PCT/EP2019/060525
§ 371 (c)(1),
(2) Date: Oct. 26, 2020

(87) PCT Pub. No.: WO2019/207001
PCT Pub. Date: Oct. 31, 2019

(65) Prior Publication Data
US 2021/0243021 A1     Aug. 5, 2021

(30) Foreign Application Priority Data
Apr. 26, 2018 (EP) .................... 18305522

(51) Int. Cl.
*H04L 9/00* (2022.01)
*H04L 9/08* (2006.01)
*H04L 9/32* (2006.01)

(52) U.S. Cl.
CPC .......... *H04L 9/0869* (2013.01); *H04L 9/0866* (2013.01); *H04L 9/3249* (2013.01); *H04L 9/3278* (2013.01)

(58) Field of Classification Search
CPC ... H04L 9/0869; H04L 9/0866; H04L 9/3249; H04L 9/3278
See application file for complete search history.

(56) References Cited

U.S. PATENT DOCUMENTS 8,415,969 B1   4/2013   Ficke et al.
9,992,031 B2   6/2018   Gotze et al.
(Continued)

FOREIGN PATENT DOCUMENTS

CN   107194117 A   9/2017
JP   201110277 A   1/2011
(Continued)

OTHER PUBLICATIONS

PCT/EP2019/060525, International Search Report, dated May 8, 2019, European Patent Office, P.B.5818 Patentlaan 2 NL—2280 HV Rijswijk.
(Continued)

*Primary Examiner* — Phy Anh T Vu
(74) *Attorney, Agent, or Firm* — The Jansson Firm; Pehr B. Jansson (57) ABSTRACT

A method, cryptographic device, and computer readable memory with instructions, for generating a cryptographic key from at least one prime number, by performing during runtime of the cryptographic device by obtaining from memory a challenge and at least one associated increment number, generating a seed by applying a Physically Unclonable function to said obtained challenge, generating at least one prime number from said generated seed by performing said cryptographic prime numbers generation algorithm and by performing therein as many incrementation steps as said obtained at least one increment number, and generating the cryptographic key from the generated prime number.

17 Claims, 5 Drawing Sheets

(56) References Cited

U.S. PATENT DOCUMENTS

| | | | |
|---|---|---|---|
| 10,608,813 B1* | 3/2020 | Lazier | G06F 21/602 |
| 2010/0054466 A1* | 3/2010 | Kerins | G06F 7/588 |
| | | | 380/46 |
| 2010/0329455 A1* | 12/2010 | Nemiroff | H04L 9/0869 |
| | | | 380/46 |
| 2011/0002461 A1 | 1/2011 | Erhart et al. | |
| 2013/0051552 A1* | 2/2013 | Handschuh | H04L 9/0866 |
| | | | 380/44 |
| 2015/0026545 A1* | 1/2015 | Yu | H03M 13/152 |
| | | | 714/780 |
| 2015/0234751 A1* | 8/2015 | Van Der Sluis | H04L 9/0866 |
| | | | 713/193 |
| 2015/0236693 A1 | 8/2015 | Pfeiffer et al. | |
| 2017/0038807 A1* | 2/2017 | Bittlestone | G06F 21/73 |
| 2017/0063559 A1* | 3/2017 | Wallrabenstein | H04L 9/3026 |
| 2017/0200508 A1 | 7/2017 | Grigoriev et al. | |
| 2018/0006813 A1* | 1/2018 | Van Der Leest | H04L 9/0869 |
| 2020/0057611 A1* | 2/2020 | Berzati | H04L 9/3033 |
| 2020/0396092 A1* | 12/2020 | Cambou | H04L 9/3278 |
| 2021/0091952 A1* | 3/2021 | Wentz | H04L 9/3247 |

FOREIGN PATENT DOCUMENTS

| | | |
|---|---|---|
| WO | WO2004002058 A2 | 12/2003 |
| WO | WO2017021254 A1 | 2/2017 |

OTHER PUBLICATIONS

PCT/EP2019/060525, International Search Report, dated May 8, 2019, European Patent Office, D-80298 Munich.

PCT/EP2019/083883, International Search Report, dated Feb. 19, 2020, European Patent Office, P.B.5818 Patentlaan 2 NL—2280 HV Rijswijk.

PCT/EP2019/083883, Written Opinion of the International Searching Authority, dated Feb. 19, 2020, European Patent Office, D-80298 Munich.

* cited by examiner

METHOD FOR GENERATING ON-BOARD A CRYPTOGRAPHIC KEY USING A PHYSICALLY UNCLONABLE FUNCTION

FIELD OF THE INVENTION

The present invention relates to the field of cryptographic key generation methods and devices, and more particularly to on-board key generation using a physically unclonable function.

BACKGROUND OF THE INVENTION

Cryptographic algorithms are commonly used for ensuring the privacy of communications by encryption, for authentication or for generating a verifiable signature. Most cryptographic algorithms require a cryptographic key for performing any cryptographic operation. Such a key shall be stored in a memory of a cryptographic device before first use of a cryptographic algorithm and may have to be renewed later on, for example when the original key has been compromised.

A key generation process often builds a new cryptographic key from a prime number. As a result, it often comprises performing primality tests, such as the Miller Rabin test, for retrieving such a prime number.

Such tests involve computing modular exponentiations which are costly operations. Since some cryptographic devices such as SIM cards, banking cards or other smartcards, have a low processing power, ways have been searched to decrease the calculation cost associated to renewing a cryptographic key.

A first existing solution is to store multiple keys on a device in order to be able to change a cryptographic key by a new one without computing a new prime number and a new key. A first problem of such a solution is that the number of keys embedded in the device cannot be extended after its personalization step. Another problem is that storing multiple keys in the device increases non-volatile memory (NVM) consumption and increases the risk of attacks (dump, probing . . . ) seeking to retrieve a valid key from the device.

A second existing solution is to store seeds in the device from which a prime number may be generated quickly. Using a seed reduces the cost of generating a new prime number but it has the same drawbacks as the previous solution.

A third existing solution is to download keys from a distant server such as a certificate authority, when needed. Such solution has a negligible calculation cost and does not expose any data stored in the device to attacks. On the other hand, it requires to maintain some additional infrastructure in addition to the cryptographic device and requires a secure link to the server in order to avoid eavesdropping.

As a result there is still a need for a method enabling to make a new cryptographic key available on a cryptographic device at runtime with a limited calculation cost and memory footprint, and with a lower risk of exposure of the new key or of a corresponding seed.

SUMMARY OF THE INVENTION

For this purpose and according to a first aspect, this invention therefore relates to a method for generating a cryptographic key from at least one prime number, comprising the following steps performed at runtime by a cryptographic device comprising at least one hardware processor, a Physically Unclonable function and a memory storing at least one challenge and at least one associated increment number, said associated increment number being a number of incrementation steps to be performed in a predefined cryptographic prime numbers generation algorithm to generate said at least one prime number from a seed obtained from said challenge using said Physically Unclonable function:

obtaining from said memory a challenge and at least one associated increment number, generating a seed by applying said Physically Unclonable function to said obtained challenge, generating said at least one prime number from said generated seed by performing said cryptographic prime numbers generation algorithm and by performing therein as many incrementation steps as said obtained at least one increment number, generating said cryptographic key from said generated prime number.

The method according to the first aspect may also comprise the following steps performed by said cryptographic device during an enrollment phase:

generating a seed by applying said Physically Unclonable function of the cryptographic device to a challenge, storing, in said memory of the cryptographic device, said challenge and at least one associated increment number defined as the number of incrementation steps to be performed in a cryptographic prime numbers generation algorithm for generating said prime number from said seed.

Such a method enables to make most of the computations at the enrollment, before a new cryptographic key is needed including primality tests. At runtime, a cryptographic key may be generated by the cryptographic at a reduced cost. In addition, the data stored in the cryptographic device (the challenge and the associated increment number) are not sensitive data. An attacker cannot use it to generate a key since he cannot reproduce the Physically Unclonable Function of the cryptographic device, which is mandatory for generating the correct seed.

According to a first embodiment, the method according to the first aspect may comprise further, performed by said cryptographic device, a step of reception of said challenge from a server connected to said cryptographic device and a step of transmission of said generated seed to said server.

In this first embodiment, the method according to the first aspect may comprise further, during the enrollment phase, performed by said server:

sending said challenge to the cryptographic device, receiving said generated seed from the cryptographic device, generating a prime number from said seed by performing several incrementation steps in a cryptographic prime numbers generation algorithm, sending, to said cryptographic device for storing in memory, said at least one increment number defined as the number of incrementation steps performed in said cryptographic prime numbers generation algorithm for generating said prime number.

By doing so, at the enrollment phase most of the calculations are performed by the server, which enables to benefit from the larger computational power of the server.

According to a second embodiment, the method according to the first aspect may comprise further, performed by said cryptographic device:

generating said challenge, generating a prime number from said seed by performing several incrementation steps in a cryptographic prime numbers generation algorithm, and generating said at least one associated increment number defined as the number of incrementation steps performed in said cryptographic prime numbers generation algorithm for generating said prime number.

In such a case all the computations at the enrollment phase are performed by the cryptographic device, which avoids exchanging messages with a distant server and improves security.

The cryptographic prime numbers generation algorithm may be among FIPS 186-4 appendix A.1.1.2 and ANS X9.31, rDSA.

The cryptographic key may be among a RSA key or an ECC key.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device comprising:

at least one hardware processor configured to perform the method according to the first aspect, at least one memory for storing the challenges and the associated increment numbers.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at providing a method enabling a cryptographic device 101 to generate on demand, at a limited calculation cost, at least one prime number needed for generating one or more cryptographic keys, for example a key for symmetric encryption/decryption or a public key-private key pair for an asymmetrical encryption algorithm.

There exists several well-known algorithms generating prime numbers from a seed values such as FIPS 186-4 appendix A.1.1.2 and ANS X9.31 (version approved in 1998), *rDSA Digital Signatures Using Reversible Public Key Cryptography* for the Financial Services Industry developed for the American National Standards Institute by the Accredited Standards Committee on Financial Services, X9, (see http://www.x9.org).

Such algorithms generate at least one prime number from a seed value by repeatedly obtaining a candidate number by incrementing some value computed from the seed and then testing the primality of this candidate number, until the primality test is positive. Such kind of calculation may be very expensive.

The main idea of the invention is to perform such a calculation during an enrollment phase, before the runtime phase during which the prime number is actually needed, and to store in the cryptographic device the number of incrementation steps to be performed using the chosen algorithm to generate at least one prime number from a given seed. By doing so, the cryptographic device can generate again at runtime the prime number(s) obtained during the enrollment phase from the seed by just performing again the required number of incrementation steps. Since the cryptographic device has no need to perform primality tests after each incrementation step, the prime number(s) can be generated at runtime at a much lower calculation cost than during the enrollment phase. In order to decrease even more the amount of calculation to be performed by the cryptographic device, most of the calculations to be performed at the enrollment phase may be performed by a remote server 102.

A drawback of using such algorithms generating at least one prime number from a seed for generating a cryptographic key, is that any attacker getting access to the seed can generate the same prime number(s) and cryptographic key, and may then use it maliciously. The seed to be used in a prime generation algorithm along with a number of incrementation steps shall therefore be protected from any unauthorized access. In order to prevent any such access to stored seeds by an attacker, another feature of the invention is to avoid storing seed values by making the cryptographic device securely generate on-the-fly a seed when it is needed as input to a prime generation algorithm. Such a secure generation may be performed by processing a challenge using a Physically Unclonable Function (PUF).

Such a PUF is a function implemented by a hardware circuit whose result depends on physical factors randomly set during its manufacturing, such as the microstructure of this hardware circuit. Consequently, such a PUF is unique, unpredictable and cannot be reproduced.

According to the present invention, the cryptographic device only stores a challenge, from which it is able to get a seed using the PUF, and the number of incrementation steps to be performed using a chosen algorithm to generate at least one prime number from this seed. When a new cryptographic key is needed, it may read a challenge stored in its memory and apply the PUF to it to get a seed. It may run a predefined prime number generation algorithm, using the seed and the number of incrementation steps stored along the challenge as inputs, in order to generate at least one prime number; and to generate a cryptographic key from this prime.

Such a method of generating a cryptographic key is much safer than storing seeds in the cryptographic device: an attacker getting access to the content of the memory of the cryptographic device would be unable to use a challenge since he cannot reproduce the PUF of the cryptographic device and recompute the seed that would be obtained from processing the challenge with this PUF.

Figure 1:
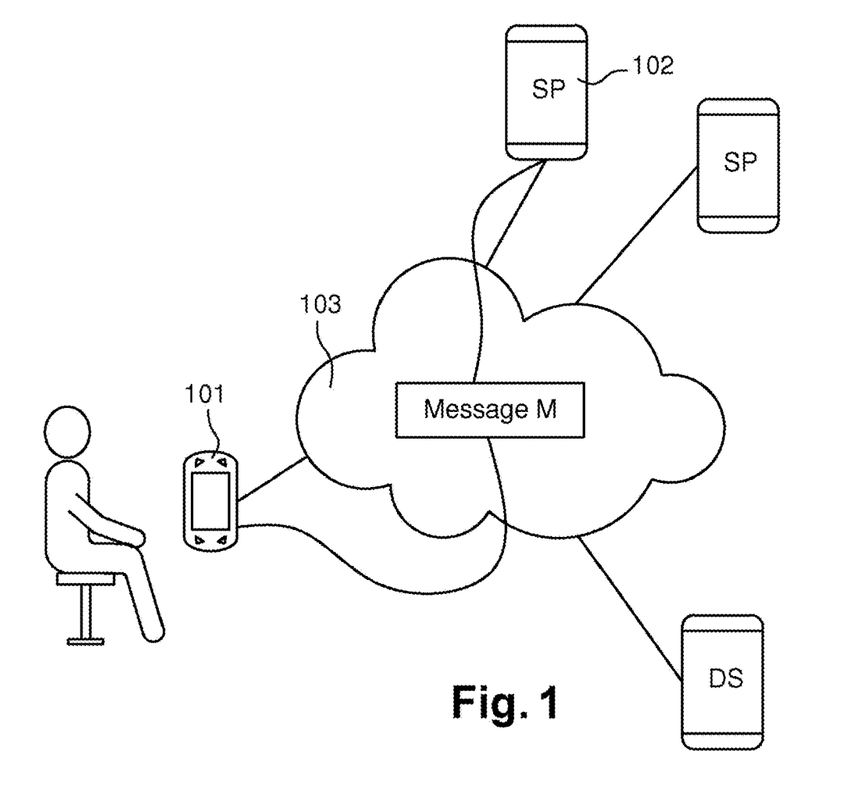
FIG. 1 is a schematic illustration of a system according to an embodiment of the present invention.

FIG. 1 is a schematic illustration of a network 103 connecting a cryptographic device 101, e.g. a smartcard or a mobile telephone, to a remote server 102. The cryptographic device 101 may be connected to a personal computer operated by a user and sending commands to the cryptographic device for cryptographic operations such as data encryption or decryption. Alternatively, the cryptographic device 101 may be embedded in such a computer.

Figure 2:
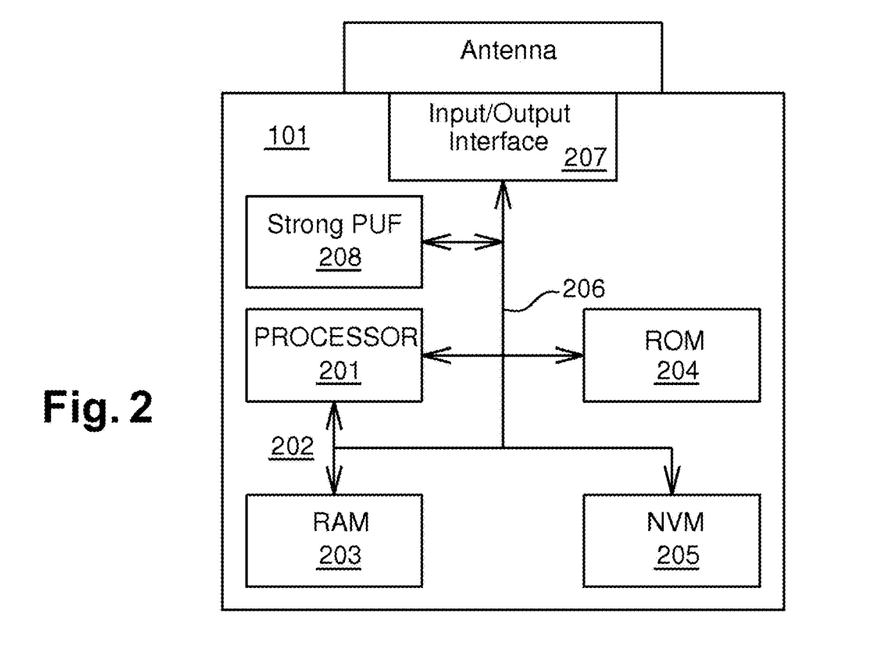
FIG. 2 is a schematic illustration of a cryptographic device according to an embodiment of the present invention.

FIG. 2 is a schematic illustration of a cryptographic device 101. It may include a processor 201 connected via a bus 202 to a random access memory (RAM) 203, a read-only memory (ROM) 204, and/or a non-volatile memory (NVM) 205. A sub-part of the memory, ROM and/or NVM, of the cryptographic device 101 may store sensitive data such as a secret key or such as information needed to generate a new secret key, as described in the next paragraphs.

The cryptographic device 101 further includes a connector 206 connected to the processor and by which the cryptographic device 101 may be connected to an antenna. Such an antenna may be used to connect the cryptographic device 101 to various forms of wireless networks, e.g., wide-area networks, WiFi networks, or mobile telephony networks. Alternatively, the cryptographic device 101 may connect to networks via wired network connections such as Ethernet.

The cryptographic device 101 may also include input/output means 207 providing interfaces to the user of the cryptographic device 101, such as one or more screens, loudspeakers, a mouse, tactile surfaces, a keyboard etc. . . .

Figures 3, 4A:
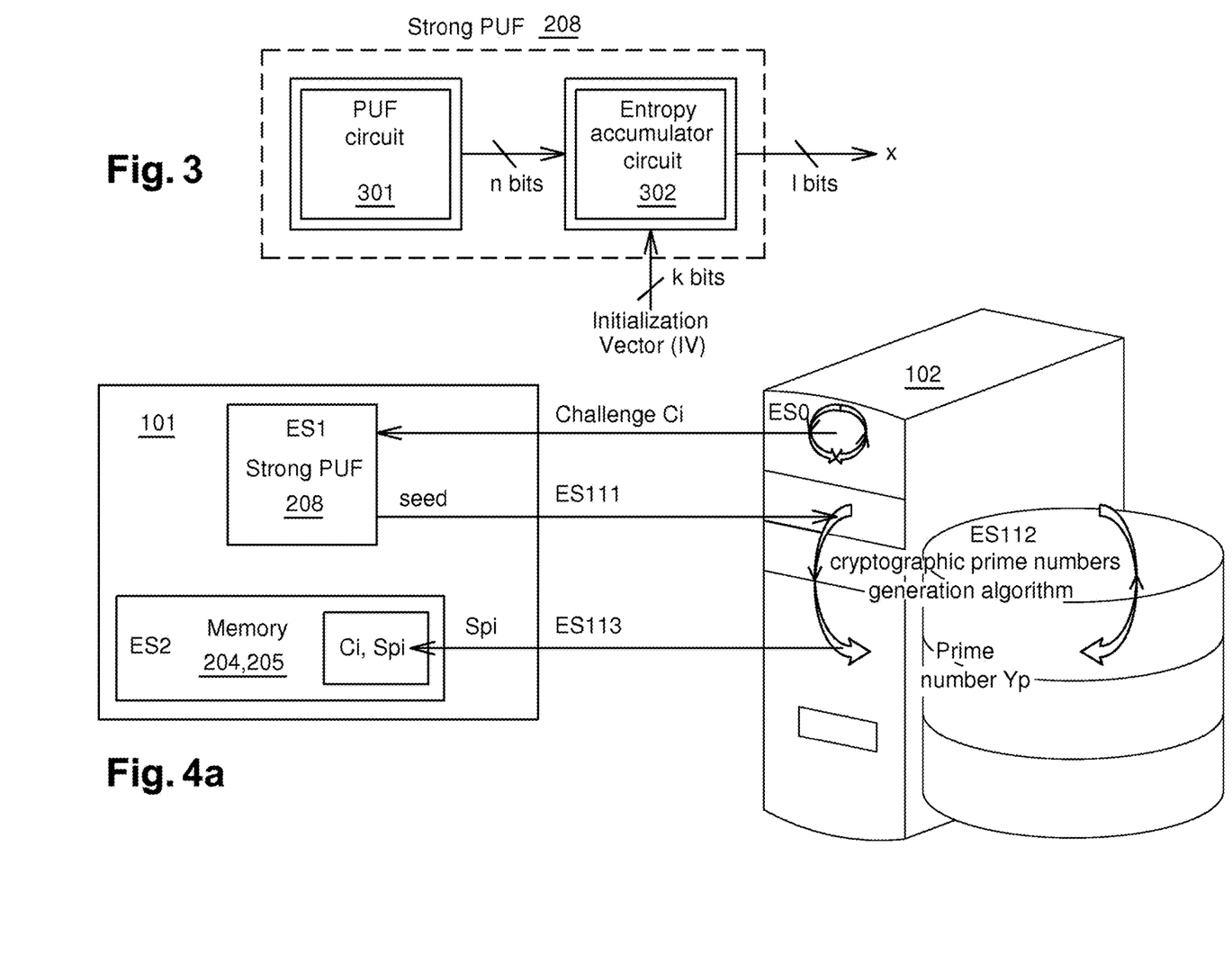
FIG. 3 is a schematic illustration of a Physically Unclonable function of the cryptographic device according to an embodiment of the present invention.
FIGS. 4a and 4b illustrate schematically several embodiments of an enrollment phase of the present invention.

The cryptographic device 101 also includes a strong PUF module 208, illustrated on FIG. 3, including a PUF circuit 301 performing a Physically Unclonable Function as defined here above. In order to ensure a minimum level of entropy at the output of the strong PUF module, the latter also includes an entropy accumulator circuit 302 applying to the output of the PUF circuit a function increasing its entropy, such as a hash function. The entropy accumulator circuit 302 may also use as input an initialization vector (IV). The whole function performed by the strong PUF module is called "strong PUF" in the following paragraphs.

The cryptographic device 101 may be a tamper resistant device secured against any unauthorized access The following paragraphs describe, as depicted on FIGS. 4a and 4b, the steps performed by the cryptographic device 101 during an enrollment phase, for generating and storing the elements that will be needed later at runtime for generating easily at least one prime number.

During a first enrollment step ES1, the cryptographic device generates a seed by applying its strong Physically Unclonable function to a challenge Ci.

During a second enrollment step ES2, the cryptographic device stores in its memory said challenge and at least one associated increment number Spi defined as the number of incrementation steps to be performed in a cryptographic prime numbers generation algorithm for generating at least one prime number from the seed generated during the first enrollment step ES1. The number of increment numbers associated to a challenge may depend on the corresponding algorithm chosen for generating a prime number.

In a first embodiment, illustrated on FIG. 4a, in order to minimize the computations to be performed by the cryptographic device during this enrollment phase, the server is in charge of transmitting the challenge to the cryptographic device and of determining the number of incrementation steps to be performed for generating at least one prime number from the seed generated from this challenge.

In such a case, the enrollment phase comprises a preliminary enrollment step ES0 during which the server may generate the challenge and send it to the cryptographic device which receives the challenge from the server. In such a case the enrollment phase comprises also a prime number generation enrollment step ES11 comprising:

- an enrollment step ES111 during which the cryptographic device sends to the server the seed it generated from the challenge sent by the server, and the server receives the generated seed from the cryptographic device,
- an enrollment step ES112 during which the server generates at least one prime number Ypi from the seed by performing several incrementation steps in a cryptographic prime numbers generation algorithm,
- an enrollment step ES113 during which the server sends to said cryptographic device, for storing in its memory, the at least one increment number Spi defined as the number of incrementation steps performed in the cryptographic prime numbers generation algorithm for generating the prime number.

Figure 4B:
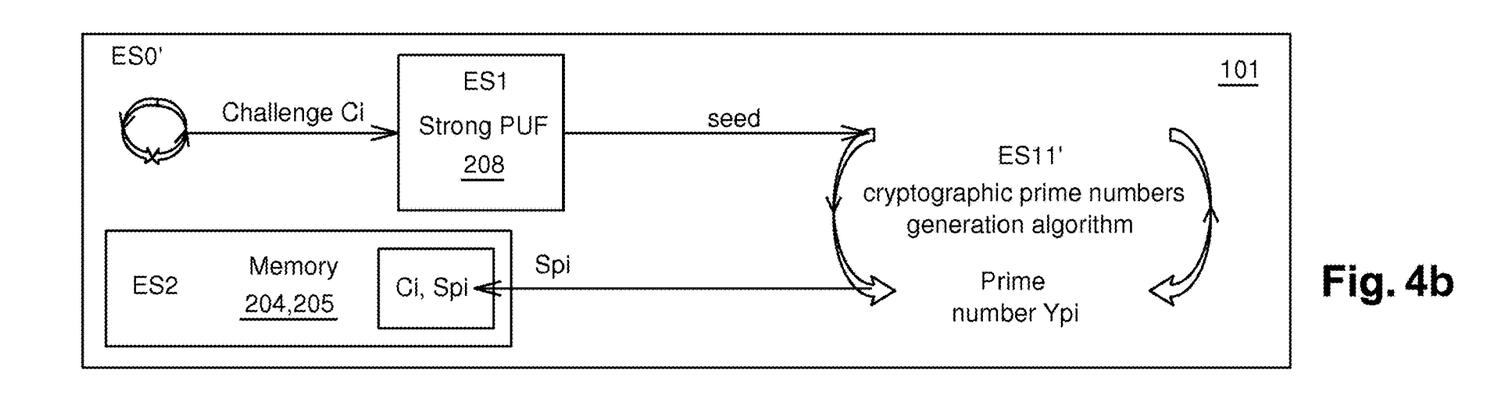

In a second embodiment, illustrated on FIG. 4b, all the computations performed during the enrollment are performed by the cryptographic device 101 itself. In such a case, the enrollment phase comprises an alternative preliminary enrollment step ES0' during which the cryptographic device may generate the challenge. In such a case the enrollment phase comprises an alternative prime number generation enrollment step ES11' during which the cryptographic device:

- generates a prime number Ypi, from the seed it generated during the first enrollment step ES1, by performing several incrementation steps in a cryptographic prime numbers generation algorithm,
- and generates the at least one associated increment number Spi defined as the number of incrementation steps performed in the cryptographic prime numbers generation algorithm for generating the prime number.

By doing so, in both embodiments, at the end of the enrollment phase the cryptographic device stores in its memory a challenge and at least one associated increment number such that it can generate a seed from the challenge, and then generate at least one prime number from the seed by performing as many incrementation steps as the associated increment number(s) in the cryptographic prime number algorithm.

Figure 5:
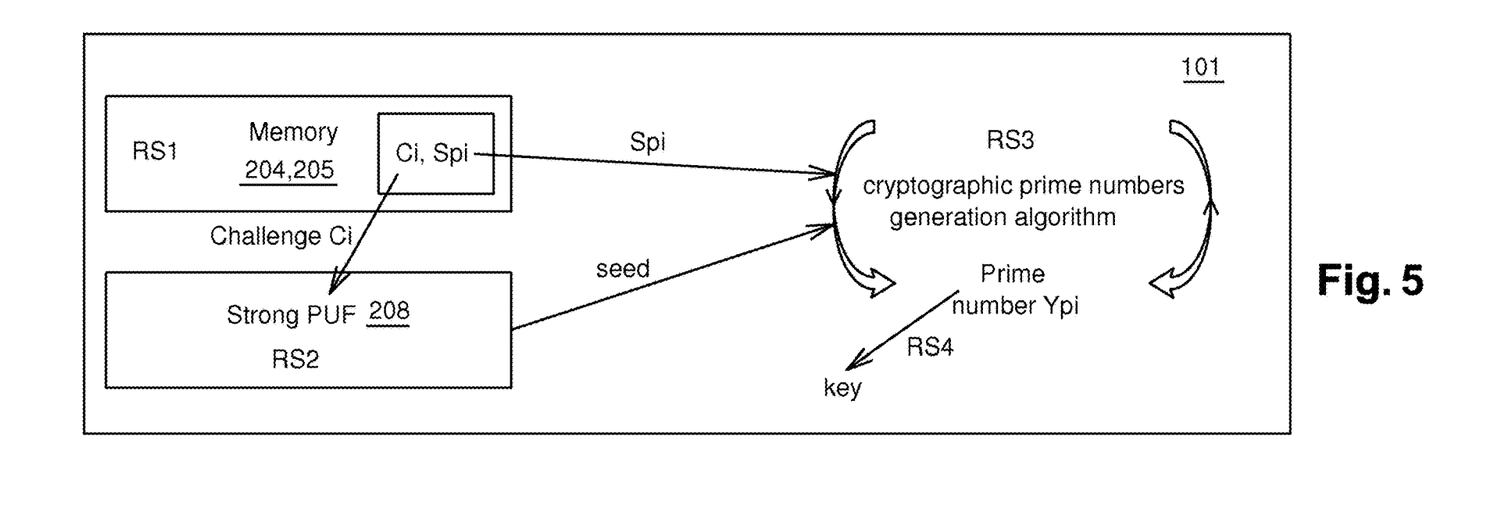
FIG. 5 illustrate schematically a run time phase according to an embodiment of the present invention.

The following paragraphs describe, as depicted on FIG. 5, the steps of a method, according to a first aspect of the invention, performed by the cryptographic device 101 at runtime after the enrollment phase, for generating a cryptographic key from at least one prime number.

As described here above, the memory 204, 205 of the cryptographic device stores at least one challenge and at least one associated increment number which is the number of incrementation steps to be performed in a predefined cryptographic prime numbers generation algorithm to generate said prime number(s) from a seed obtained from said challenge using the strong PUF performed by the PUF module of the cryptographic device.

During a first runtime step RS1, the cryptographic device obtains from its memory a challenge Ci and the associated at least one increment number Spi.

During a second runtime step RS2, the cryptographic device generates a prime number generation seed by applying its strong Physically Unclonable function to the challenge obtained during the first runtime step RS1.

During a third runtime step RS3, the cryptographic device generates the at least one prime number from the generated seed by performing said cryptographic prime numbers generation algorithm and by performing therein as many incrementation steps as the obtained at least one increment number Spi.

During a fourth runtime step RS4, the cryptographic device generates a cryptographic key from the generated prime number. The generated cryptographic key may for example be among a RSA key, a DSA key, a Diffie-Hellman key, a ECDSA key, a ECD key or an ECC key, or any cryptographic key used by a public key algorithm based on the practical difficulty of factoring problem or of discrete logarithm problem.

In the following paragraphs, two examples of implementation based on ANS X9.31 and FIPS 186-4 appendix A.1.1.2 prime generation algorithms are given. These are non-limiting examples of implementation and the method according to the invention may be implemented based on various other prime generation algorithms.

A first example of implementation is given in which the cryptographic prime numbers generation algorithm used to generate a prime number is the algorithm ANS X9.31.

Figure 6:
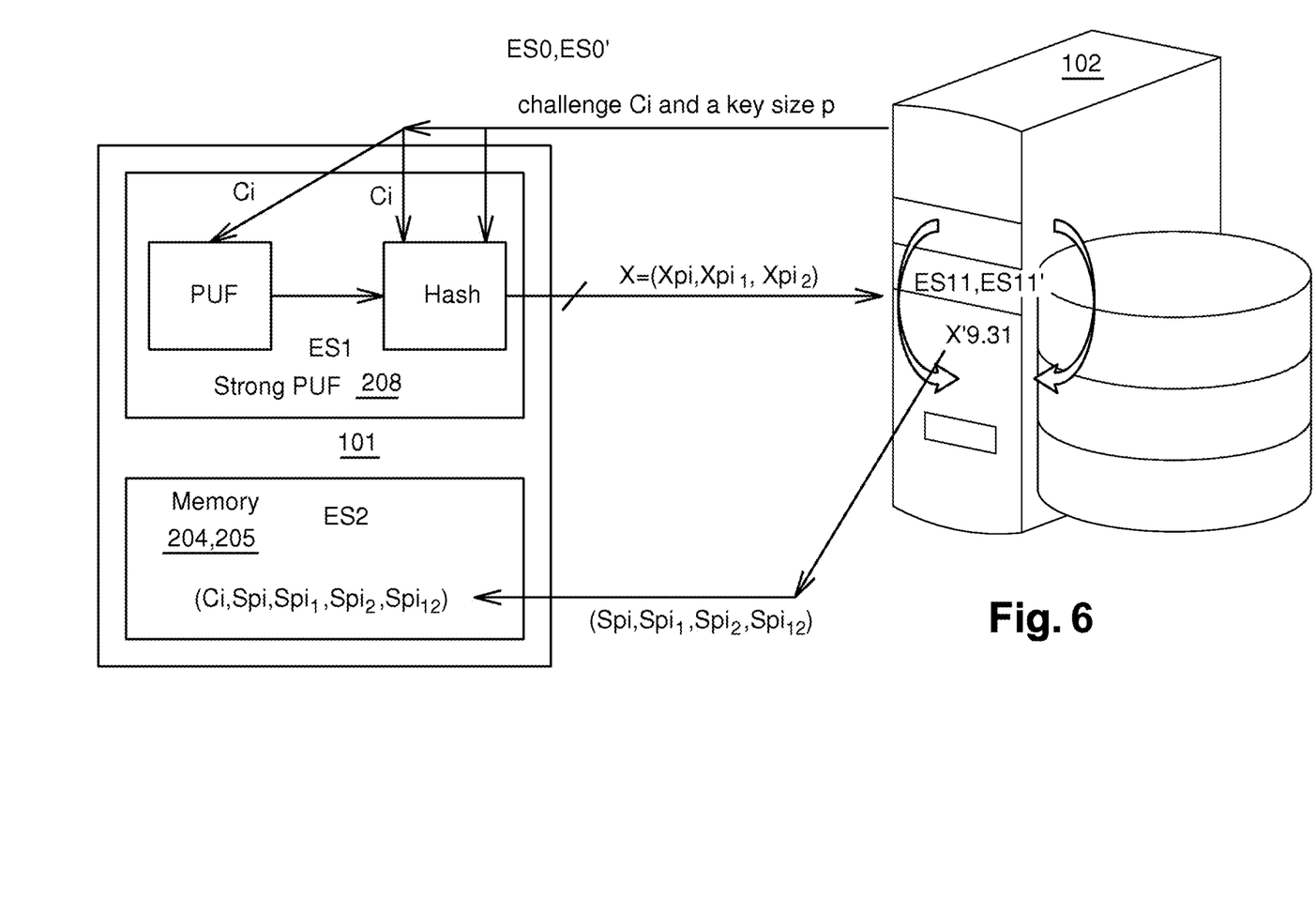
FIGS. 6 and 7 illustrate schematically an example of implementation in which the cryptographic prime numbers generation algorithm used to generate a prime number is the algorithm ANS X9.31.

The operations performed during the enrollment phase in that case are shown on FIG. 6, corresponding to the first embodiment in which the server determines the number of incrementation steps to be performed for generating a prime number.

During the preliminary enrollment step ES0/ES0', a challenge Ci is either generated by the cryptographic device or generated by the server and transmitted to the cryptographic device. The cryptographic device also knows a key size p, which is the size of the key to be generated and which may be transmitted by the server, an increment pace b which is an integer, and a public parameter e, for example a RSA public key.

During the first enrollment step ES1, the cryptographic device generates a seed from the challenge Ci. In the case of X9.31 algorithm, the seed is composed of three parts $Xpi$, $Xpi_1$ and $Xpi_2$:

$$(Xpi, Xpi_1, Xpi_2) = \text{Strong\_PUF}(Ci, p).$$

During the prime number generation enrollment step ES11/ES11', the cryptographic device or the server generates a prime number Ypi from the seed using X9.31 algorithm as described here under, marked X'9.31, where PrimeQ is a primality test:

1. For j=1 to 2 do
    (a) Set $pj \leftarrow Xp_{ij}$
    (b) If pj is even then set $p_j \leftarrow p_j+1$
    (c) While (PrimeQ($p_j$)=false) do $$p_j \leftarrow p_j + b$$

$$Sp_{ij} \leftarrow Sp_{ij} + 1;$$

2. Compute $R \leftarrow (p_2^{-1} \bmod p_1)p_2 - (p_1^{-1} \bmod p_2)p_1$
3. Set $Y_{pi} \leftarrow X_{pi} + ((R - X_{pi}) \bmod p_1 p_2) \Rightarrow$ Save $Spi_{12} = (R - X_{pi}) \bmod p_1 p_2$
4. If $(\gcd(Y_{pi}-1; e) \neq 1)$ or (PrimeQ($Y_{pi}$)=false) then
    (a) Set $Y_{pi} \leftarrow Y_{pi} + p_1 p_2$
    (b) Go to Step 4 and $S_{pi} \leftarrow S_{pi}+1$;
5. Output $Y_{pi}$ Using such an algorithm, the prime number $Y_{pi}$ is obtained after incrementing $p_1$ value $Spi_1$ times, $p_2$ value $Spi_2$ times and $Y_{pi}$ value $S_{pi}$ times.

At the end of the prime number generation enrollment step ES11/ES11', the values $Spi_1$, $Spi_2$, Spi, and $Spi_{12}$ are the increment numbers associated to the challenge Ci and are either generated by the cryptographic device, as outputs of the X9.31 cryptographic prime numbers generation algorithm, or sent to the cryptographic device by the server.

Finally during the second enrollment step ES2 the challenge Ci and the associated increment numbers $Spi_1$, $Spi_2$, Spi, and $Spi_{12}$ are stored by the cryptographic device.

Figure 7:
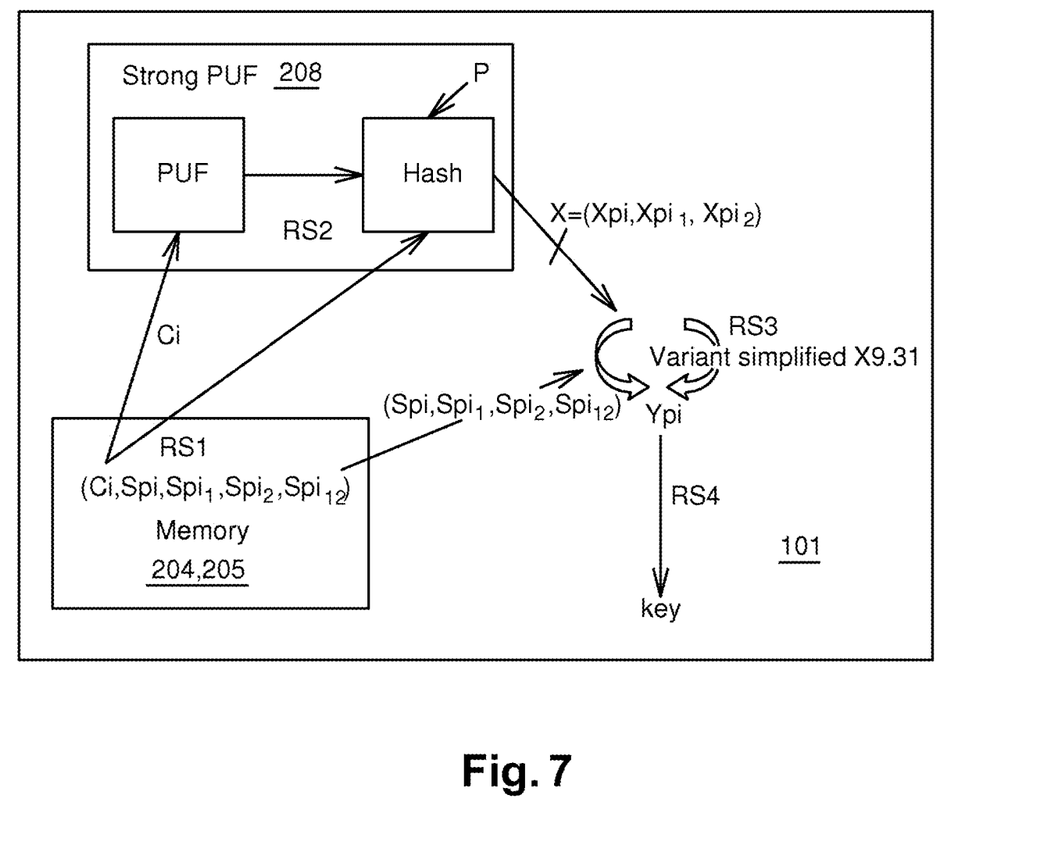

Then at runtime, as illustrated on FIG. 7, during the first runtime step RS1, the cryptographic device reads these values Ci, $Spi_1$. $Spi_2$, Spi, and $Spi_2$ from its memory.

During the second runtime step RS2, the cryptographic device generates again the prime number generation seed ($Xpi$, $Xpi_1$, $Xpi_2$) by applying its strong Physically Unclonable function to the challenge Ci $$(Xpi, Xpi_1, Xpi_2) = \text{Strong\_PUF}(Ci, p).$$

During the third runtime step RS3, the cryptographic device generates again the prime number $Y_{pi}$ from the generated seed by performing the following computations, called simplified X9.31 variant:

1. a/ Compute $p_1 \leftarrow Xpi_1 + Spi_1.b$
    b/ Compute $p_2 \leftarrow Xpi_2 + Spi_2.b$
2. a/ Compute $Ip_2 \leftarrow p_1^{-1} \bmod p_2$
    b/ Compute $Rt \leftarrow p_2 . 2Ip_2 + p_1.p_2 - 1$
    c/ Compute $T \leftarrow X_{pi} \bmod p_1.p_2$
    d/ Compute $U \leftarrow Rt - T$
    e/ Compute $U \leftarrow U - Spi_{12}.p_1.p_2$
3. Compute $Y_{pi} = X_{pi} + U + Spi.2.p_1.p_2$ By doing so, the cryptographic device is able to regenerate the prime number Ypi much faster than during the enrollment phase.

In the following paragraphs, a second example of implementation is given in which the cryptographic prime numbers generation algorithm used to generate at least one prime number is a modified version of the algorithm FIPS 186-4 appendix A.1.1.2.

This algorithm may be used for the generation of a first prime number p and a second prime number q. This algorithm uses as inputs a desired length L of the first prime number p, a desired length N of the second prime number q, and the length SL of the seed generated by the strong PUF ($\geq N$). It uses a hash function of output length outlen.

Here below are detailed the operations performed during the enrollment phase when using this algorithm:

First, this algorithm:
1. Computes n=ceil(L/outlen) where outlen stands for the Hash output block length
2. Computes BL=L−1−(n*outlen)

Then for generating the second prime number q:
3. During the preliminary enrollment step ES0/ES0', a challenge Cq is either generated by the cryptographic device or generated by the server and transmitted to the cryptographic device: Cq=Random value
4. During the first enrollment step ES1, the cryptographic device generates a seed U from the challenge Cq and from the length SL of the seed: U=Hash (StrongPUF(Cq, SL)) mod $2^{N-1}$ Then, during the prime number generation enrollment step ES11/ES11', the cryptographic device or the server generates prime numbers p, q from the seed U
5. Compute $q=2^{N-1}+U+1-(U \bmod 2)$
6. Test primality of q and if not prime, go to step 3. Else save Cq parameter.

For generating p coprime to q
7. set offset=1
8. For counter=0 to (4L−1) do
   8.1. For j=0 to n do
   Compute Vj=Hash (StrongPUF(Cq, SL)+offset+j) mod $2^{SL}$
   8.2. Compute W=Sum (j=0; j<BL) (Vj*$2^{j*outlen}$)
   8.3. Compute X=W+$2^{L-1}$
   8.4. Compute C=X mod 2q
   8.5. Compute p=X−(C−1)
   8.6. If p<$2^{L-1}$ then go to 8.8
   8.7. Test primality of p, if p prime Save offp=offset and return (Cq, offp)
   8.8. set offset=offset+n+1

At the end of the prime number generation enrollment step ES11/ES11', the value offp is the increment number associated to the challenge Cq and is either generated by the cryptographic device, as output of the cryptographic prime numbers generation algorithm, or sent to the cryptographic device by the server.

Finally during the second enrollment step ES2 the challenge Cq and the associated increment number offp are stored by the cryptographic device.

Here under are detailed the steps performed during the runtime phase.

At runtime, during the first runtime step RS1, the cryptographic device reads these values Cq and offp from its memory. The cryptographic device knows also the desired length L of the first prime number p, the desired length N of the second prime number q, and the length SL of the seed (≥N).

Then the cryptographic device
1. Computes n=ceil(L/outlen)
2. Computes BL=L−1−(n*outlen)
3. During the second runtime step RS2, the cryptographic device generates again the prime number generation seed U by applying its strong Physically Unclonable function to the challenge Cq: U=Hash (StrongPUF(Cq,SL)) mod $2^{N-1}$ During the third runtime step RS3, the cryptographic device generates again the first prime number p and the second prime number q from the generated seed U by performing the following computations:
4. Compute $q=2^{N-1}+U+1-(U \bmod 2)$ For Generating p coprime to q
5.1. For j=0 to n do
Compute Vj=Hash (StrongPUF(Cq, SL)+offp+j) mod $2^{6L}$
5.2. Compute W=Sum (j=0; j<BL) (Vj*$2^{j*outlen}$)
5.3. Compute X=W+$2^{L-1}$
5.4. Compute C=X mod 2q
5.5. Compute p=X−(C−1)
5.6 return pair (p, q)

By doing so, the cryptographic device is able to regenerate the prime numbers p and q much faster than during the enrollment phase.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a non-transitory computer readable medium storing executable computer code that when executed by a cryptographic device comprising at least one hardware processor performs the methods according to the first aspect.

According to a fourth aspect, this invention therefore relates also to a cryptographic device 101 comprising:
- at least one hardware processor 201 configured to perform the steps of the methods according to the first aspect,
- at least one memory 203, 204, 205 for storing the challenges and the associated increment numbers.

The invention claimed is:

1. A method for securing operation of a cryptographic device in generating a cryptographic key from at least one prime number, comprising the following steps performed at runtime by the cryptographic device, the cryptographic device comprising at least one hardware processor, a Physically Unclonable function and a memory, the memory storing at least one challenge and at least one associated increment number, said associated increment number being a number of incrementation steps to be performed in a predefined cryptographic prime numbers generation algorithm to generate said at least one prime number from a first seed obtained from a first challenge of said at least one challenge using said Physically Unclonable function:
    obtaining from said memory said first challenge and said at least one increment number associated with said first challenge,
    generating a first seed by applying said Physically Unclonable function to said obtained first challenge, wherein said Physically Unclonable function is specific to the cryptographic device,
    generating said at least one prime number from said generated first seed by performing said predefined cryptographic prime numbers generation algorithm on said generated first seed and by performing therein the number of incrementation steps to be performed in said predefined cryptographic prime numbers generation algorithm,
    generating said cryptographic key from said at least one generated prime number, and
    performing, by said cryptographic device, a cryptographical operation using said generated cryptographic key.

2. The method of claim 1, comprising the following steps performed by said cryptographic device during an enrollment phase:
    generating a second seed by applying said Physically Unclonable function of the cryptographic device to the first challenge wherein the first seed and the second seed are equal in value,
    storing, in said memory of the cryptographic device, said first challenge and the at least one associated increment number, the at least one associated increment number defined as the number of incrementation steps to be performed in said predefined cryptographic prime numbers generation algorithm for generating said at least one prime number from said first seed.

3. The method of claim 2 comprising further, performing by said cryptographic device, a step of receiving of said first challenge from a server connected to said cryptographic device and a step of transmitting of said second generated seed to said server.

4. The method of claim 3, comprising, during the enrollment phase, performing by said server:
sending said first challenge to the cryptographic device,
receiving said second generated seed from the cryptographic device,
generating a prime number from said second generated seed by performing the number of incrementation steps in said predefined cryptographic prime numbers generation algorithm,
sending, to said cryptographic device for storing in said memory, said at least one associated increment number defined as the number of incrementation steps performed in said predefined cryptographic prime numbers generation algorithm for generating said prime number.

5. The method of claim 2, comprising further, performing by said cryptographic device:
generating said first challenge,
generating a prime number from said second generated seed by performing the number of incrementation steps in said predefined cryptographic prime numbers generation algorithm, and generating said at least one associated increment number defined as the number of incrementation steps performed in said predefined cryptographic prime numbers generation algorithm for generating said prime number from said second generated seed.

6. The method of claim 1 wherein said predefined cryptographic prime numbers generation algorithm is among FIPS 186-4 appendix A.1.1.2 and ANS X9.31, rDSA.

7. The method of claim 1 wherein said cryptographic key is among a RSA (Rivest-Shamir-Adleman) key or an ECC (Elliptic Curve Cryptography) key.

8. A non-transitory computer readable medium storing executable computer code to secure generation of a cryptographic key that when executed by a cryptographic device comprising at least one hardware processor, the hardware processor implementing with a Physically Unclonable function and comprising a memory storing at least one challenge and at least one associated increment number, said associated increment number being a number of incrementation steps to be performed in a predefined cryptographic prime numbers generation algorithm to generate at least one prime number from a seed obtained from a first challenge of said at least one challenge using said Physically Unclonable function, wherein the executable computer code, when executed by the hardware processor, causes the hardware processor to:
obtain from said memory said first challenge and said at least one increment number associated with said first challenge,
generate a first seed by applying said Physically Unclonable function to said obtained first challenge, wherein said Physically Unclonable function is specific to the cryptographic device,
generate said at least one prime number from said generated first seed by performing said predefined cryptographic prime numbers generation algorithm on said generated first seed and performing therein the number of incrementation steps to be performed in said predefined cryptographic prime numbers generation algorithm,
generate said cryptographic key from said at least one generated prime number, and
perform, by said cryptographic device, a cryptographical operation using said generated cryptographic key.

9. The non-transitory computer readable medium storing executable computer code of claim 8, wherein the executable code further causes the hardware processor, during an enrollment phase, to:
generate a second seed by applying said Physically Unclonable function of the cryptographic device to said first challenge wherein the first seed and the second seed are equal in value,
storing, in said memory of the cryptographic device, said first challenge and the at least one associated increment number defined as the number of incrementation steps to be performed in said predefined cryptographic prime numbers generation algorithm for generating said prime number from said first seed.

10. The non-transitory computer readable medium storing executable computer code of claim 9, wherein the executable code further causes the hardware processor, during an enrollment phase, to:
generating said first challenge;
generating a prime number from said second generated seed by performing the number of incrementation steps in said predefined cryptographic prime numbers generation algorithm, and generating said at least one associated increment number defined as the number of incrementation steps performed in said predefined cryptographic prime numbers generation algorithm for generating said prime number from said second generated seed.

11. The non-transitory computer readable medium storing executable computer code of claim 8 wherein said predefined cryptographic prime numbers generation algorithm is among FIPS 186-4 appendix A.1.1.2 and ANS X9.31, rDSA.

12. The non-transitory computer readable medium storing executable computer code of claim 8 wherein said cryptographic key is among a (Rivest-Shamir-Adleman) key or an ECC (Elliptic Curve Cryptography) key.

13. A cryptographic device secured against attack against generation of a cryptographic key, comprising:
at least one hardware processor implementing a Physically Unclonable function; and
a memory storing at least one challenge and at least one associated increment number, said associated increment number being a number of incrementation steps to be performed in a predefined cryptographic prime numbers generation algorithm to generate at least one prime number from a seed obtained from first challenge of said at least one challenge using said Physically Unclonable function, wherein executable computer code to compute the cryptographic key, when executed by the hardware processor, causes the hardware processor to:
obtain from said memory said first challenge and said at least one increment number associated with said first challenge,
generate a first seed by applying said Physically Unclonable function to said obtained first challenge, wherein said Physically Unclonable function is specific to the cryptographic device, generate said at least one prime number from said first generated seed by performing said predefined cryptographic prime numbers generation algorithm on said generated first seed and by performing therein the number of incrementation steps to be performed in said predefined cryptographic prime numbers generation algorithm, generate said cryptographic key from said at least one generated prime number, and perform, by said cryptographic device, a cryptographical operation using said generated cryptographic key.

14. The cryptographic device of claim 13, wherein the executable code further causes the hardware processor, during an enrollment phase, to:

generate a second seed by applying said Physically Unclonable function of the cryptographic device to the first challenge wherein the first seed and the second seed are equal in value, storing, in said memory of the cryptographic device, said first challenge and the at least one associated increment number defined as the number of incrementation steps to be performed in said predefined cryptographic prime numbers generation algorithm for generating said prime number from said first seed.

15. The cryptographic device of claim 14, wherein the executable code further causes the hardware processor, during an enrollment phase, to:

generating said first challenge;

generating a prime number from said second generated seed by performing the number of incrementation steps in said predefined cryptographic prime numbers generation algorithm, and generating said at least one associated increment number defined as the number of incrementation steps performed in said predefined cryptographic prime numbers generation algorithm for generating said prime number from said second generated seed.

16. The cryptographic device of claim 13, wherein said cryptographic prime numbers generation algorithm is among FIPS 186-4 appendix A.1.1.2 and ANS X9.31, rDSA.

17. The cryptographic device of claim 13, wherein said cryptographic key is among a RSA (Rivest-Shamir-Adleman) key or an ECC (Elliptic Curve Cryptography) key.

* * * * *